(12) United States Patent
Nithsdale

(10) Patent No.: US 10,683,802 B2
(45) Date of Patent: Jun. 16, 2020

(54) MULTI-STAGE COMPRESSOR WITH MULTIPLE BLEED PLENUMS

(71) Applicant: ROLLS-ROYCE plc, London (GB)

(72) Inventor: Lee Nithsdale, Nottingham (GB)

(73) Assignee: ROLLS-ROYCE plc, London (GB)

( * ) Notice: Subject to any disclaimer, the term of this patent is extended or adjusted under 35 U.S.C. 154(b) by 311 days.

(21) Appl. No.: 15/598,724

(22) Filed: May 18, 2017

(65) Prior Publication Data
US 2017/0356339 A1    Dec. 14, 2017

(30) Foreign Application Priority Data

Jun. 9, 2016   (GB) .................................. 1610080.2

(51) Int. Cl.
*F02C 6/08*    (2006.01)
*F02C 9/18*    (2006.01)
(Continued)

(52) U.S. Cl.
CPC ................ *F02C 6/08* (2013.01); *B64D 13/02* (2013.01); *F01D 9/041* (2013.01); *F02C 7/18* (2013.01);
(Continued)

(58) Field of Classification Search
CPC ........ F04D 29/083; F04D 29/522; F02C 6/08; F02C 9/18; F01D 9/00–065; F01D 25/00–36
See application file for complete search history.

(56) References Cited

U.S. PATENT DOCUMENTS 3,492,030 A * 1/1970 Lund ..................... F16L 27/111
                                                    285/300
3,777,489 A    12/1973 Johnson et al.
(Continued)

FOREIGN PATENT DOCUMENTS

| EP | 1 726 864 A1 | 11/2006 |
|---|---|---|
| GB | 2 267 312 A | 12/1993 |
| WO | 2016/012715 A1 | 1/2016 |

OTHER PUBLICATIONS

October 25, 2017 Search Report issued in European Patent Application No. 17171639.
(Continued)

*Primary Examiner* — Charles G Freay
*Assistant Examiner* — Thomas Fink
(74) *Attorney, Agent, or Firm* — Oliff PLC

(57) ABSTRACT

The present invention provides a multi-stage compressor for a gas turbine engine. The compressor has: a first outer casing, a second outer casing radially outward of the first outer casing, and a first bleed plenum one or more second bleed plenums located between the first and second outer casings and arranged to receive, in use, bleed flows of compressed air from respective stages of the compressor and to send the bleed flows to respective ports in the second outer casing. The first bleed plenum overlaps the, or each, second bleed plenum such that the, or each, second bleed plenum fluidly communicates with its port via a respective duct which, on extending between an off-take from the second bleed plenum to the port, passes through the first bleed plenum. The, or each, duct is configured to accommodate relative movement between the first and second outer casings.

11 Claims, 9 Drawing Sheets

(51) Int. Cl.
*B64D 13/02* (2006.01)
*F01D 9/04* (2006.01)
*F02C 7/18* (2006.01)
*F04D 19/02* (2006.01)
*F04D 29/08* (2006.01)
*F04D 29/52* (2006.01)
*F04D 29/54* (2006.01)

(52) U.S. Cl.
CPC .............. *F02C 9/18* (2013.01); *F04D 19/02* (2013.01); *F04D 29/083* (2013.01); *F04D 29/522* (2013.01); *F04D 29/545* (2013.01); *F05D 2220/323* (2013.01); *F05D 2230/642* (2013.01); *F05D 2260/20* (2013.01)

(56) References Cited

U.S. PATENT DOCUMENTS

| | | | | |
|---|---|---|---|---|
| 3,967,829 | A * | 7/1976 | Rogers | F16J 9/063 277/589 |
| 4,643,463 | A * | 2/1987 | Halling | F16L 27/0857 285/226 |
| 4,659,117 | A * | 4/1987 | Holzhausen | F16L 27/1021 180/309 |
| 5,043,553 | A * | 8/1991 | Corfe | F01D 5/186 219/121.7 |
| 5,117,629 | A * | 6/1992 | Shaw | F04D 29/522 415/115 |
| 5,160,241 | A * | 11/1992 | Glynn | F01D 9/06 415/116 |
| 5,351,478 | A * | 10/1994 | Walker | F01D 25/26 415/144 |
| 5,480,194 | A * | 1/1996 | Mantoan | F01N 13/1838 285/49 |
| 6,032,463 | A * | 3/2000 | Bock | F01N 13/10 285/226 |
| 6,047,993 | A * | 4/2000 | Jungbauer | F01N 13/1816 285/226 |
| 6,164,703 | A * | 12/2000 | Kim | F01N 13/1811 285/49 |
| 6,216,438 | B1 | 4/2001 | Aschenbruck et al. | |
| 7,941,995 | B2 * | 5/2011 | Goss | B01F 3/04049 60/322 |
| 9,353,687 | B1 * | 5/2016 | Brostmeyer | F02C 7/16 |
| 9,353,952 | B2 * | 5/2016 | Overby | F23R 3/48 |
| 9,879,566 | B2 * | 1/2018 | Morris | F02C 7/32 |
| 2004/0146339 | A1 * | 7/2004 | Lutzer | B64C 1/1453 403/226 |
| 2006/0005529 | A1 | 1/2006 | Penda et al. | |
| 2009/0103973 | A1 * | 4/2009 | Rohwedder | F16L 27/02 403/51 |
| 2010/0075171 | A1 * | 3/2010 | Cap | C22C 21/00 428/583 |
| 2016/0169104 | A1 * | 6/2016 | Rowe | F16K 31/047 251/129.12 |
| 2017/0114657 | A1 * | 4/2017 | Hussain | F02C 6/08 |
| 2017/0204789 | A1 | 7/2017 | Gallet | |
| 2017/0321562 | A1 * | 11/2017 | Jonnalagadda | F01D 11/003 |
| 2017/0328278 | A1 * | 11/2017 | Hussain | F02C 6/08 |
| 2018/0156369 | A1 * | 6/2018 | Tajiri | F02C 7/32 |
| 2018/0202589 | A1 * | 7/2018 | Tajiri | F16L 27/0857 |
| 2018/0202590 | A1 * | 7/2018 | Tajiri | F16L 27/103 |
| 2018/0209570 | A1 * | 7/2018 | Tajiri | F01D 9/06 |
| 2020/0025005 | A1 * | 1/2020 | Dunnigan | F01D 11/003 |

OTHER PUBLICATIONS

Dec. 1, 2016 Search Report issued in British Patent Application No. GB1610080.2.

* cited by examiner

MULTI-STAGE COMPRESSOR WITH MULTIPLE BLEED PLENUMS

CROSS-REFERENCE TO RELATED APPLICATIONS

This specification is based upon and claims the benefit of priority from UK Patent Application Number 1610080.2 filed on 9 Jun. 2016, the entire contents of which are incorporated herein by reference.

BACKGROUND

1. Field of the Disclosure

The present disclosure relates to multi-stage compressors e.g. for use in a gas turbine engine. In particular, it relates to a multi-stage compressor having multiple bleed plenums which receive respective bleed flows from the compressor.

2. Description of the Related Art

A gas turbine engine commonly has bleed aid taken from one or more stages of one or more compressor sections of the engine. This bleed air is held in, or passes through, respective plenums, and may be directed for use in a variety of purposes including, but not limited to, internal cooling of parts of the engine, providing handling and starting bleeds, engine and airframe anti-icing, and providing cabin air requirements. Typically, the pressures required for each of these different purposes varies. The bleed air for a particular purpose is generally therefore taken from a compressor stage which is able to provide suitable pressure, and air flow requirement for the bleed air's intended purpose.

Present engine configurations commonly take bleeds from both an intermediate pressure (IP) compressor, and a high pressure (HP) compressor to meet system requirements. However, in some engine configurations, it may be desirable to take multiple bleed flows at multiple pressures from a single multi-stage compressor. For example, in cases where an intermediate pressure compressor would not provide bleed air at a pressure high enough to meet system requirements, it may be desirable to take multiple bleeds from a high pressure compressor. However, a problem arises when trying to provide multiple bleed flows of different pressures from a single compressor, because bleeds such as the cabin air bleed have a large delivery requirement. Accordingly a port formed in an outer casing of the compressor through which the bleed flow passes must also be large, and may span almost the entire length of the compressor casing. This can leave little or no space for providing additional bleeds of different pressures from a single compressor with a conventional plenum and bleed system configuration.

The present invention aims to address the above problems.

SUMMARY

In a first aspect, the present invention provides a multi-stage compressor of a gas turbine engine, the compressor having:
  a first outer casing;
  a second outer casing radially outward of the first outer casing; and
  a first bleed plenum and one or more second bleed plenums located between the first and second outer casings and arranged to receive, in use, bleed flows of compressed air from respective stages of the compressor; and to send the bleed flows to respective ports in the second outer casing;
wherein:
  the first bleed plenum overlaps the, or each, second bleed plenum such that the, or each, second bleed plenum fluidly communicates with its port via a respective duct which, on extending between an off-take from the second bleed plenum to the port, passes through the first bleed plenum; and
  the, or each, duct is configured to accommodate relative movement between the first and second outer casings.

The present invention thereby provides a plenum and bleed system configuration in which it is possible to take multiple bleeds at different pressures from a single multi-stage compressor where there is confined space for location of plenums. Such a configuration may be particularly advantageous in a configuration where there is the requirement for at least one large port in a second outer casing of the multi-stage compressor.

In a second aspect, the present invention provides a gas turbine engine having the multi-stage compressor of the first aspect.

Optional features of the invention will now be set out. These are applicable singly or in any combination with any aspect of the invention.

The number of the second bleed plenums is not particularly limited, however there is at least one, and there may be two or more second bleed plenums. The, or each, second bleed plenum may be at least partially defined by a respective radially outer wall. The shape of this outer wall is not particularly limited, but, on a longitudinal cross-section through the compressor, may be curved, cone-shaped, or any other suitable shape which meets the plenum capacity requirements and is compatible with flow requirements. The second bleed plenums may also be partially defined by, for example, the first outer casing of the compressor. The first bleed plenum may be at least partially defined by the first and/or second outer casings of the compressor, and may additionally be at least partially defined by respective outer walls of the second bleed plenum(s). At least a part of the first bleed plenum may be disposed radially outwardly of the, or each, outer wall of the second plenum(s). Accordingly, the, or each, duct which passes through the first bleed plenum may extend substantially entirely radially through the first bleed plenum.

A given second bleed plenum may have multiple off-takes in fluid communication with multiple respective ports in the second outer casing for transport of the bleed flow away from that plenum. There may therefore be multiple ducts extending from a given second bleed plenum through the first bleed plenum. Different ports may direct different portions of the bleed flow for different purposes. For example, a bleed flow from one plenum may be separately directed via different ports in the second outer casing of the compressor to provide both cabin air requirements of an aircraft, and to provide turbine section cooling in the engine. The number of plenum off-takes and ports may be selected as appropriate for overall bleed system requirements. Different ports may also be sized according to their respective flow requirements. For example, a port for directing a bleed flow to a cabin air system may be larger than a port directing a bleed flow to cool nozzle guide vanes. Where there are multiple off-takes from one plenum, it may be advantageous to circumferentially space the off-takes around the plenum, to reduce distortion of air flow to each off-take from the plenum.

The first bleed plenum may be arranged to receive a bleed flow of compressed air from a stage of the compressor which is upstream of the stage(s) of the compressor from which the second bleed plenum(s) are arranged to receive bleed flow(s) of compressed air. For example, the first bleed plenum may receive air from the 3$^{rd}$ stage of the compressor, and two second plenums may receive air from e.g. the 5$^{th}$ and 7$^{th}$ stages of the compressor, however the stage of the compressor from which bleed flows are taken may be selected appropriately according to the desired pressure and flow requirements.

The multi-stage compressor may be a high pressure compressor.

Conveniently, one or more of the ducts may be defined by sidewalls configured as bellows which, in use, may flex to accommodate relative movement between the first and second outer casings. However, any suitable duct which is able to accommodate relative movement between the first and second outer casings may be used. For, example, one or more of the ducts may include a piston seal slideably engageable with the duct's plenum off-take to allow relative movement between the duct and the off-take, thereby accommodating for relative movement between the first and second outer casings. Other examples of suitable ducts include telescopic ducts, or flexible ducts which are able to bend to accommodate relative movement.

The, or each, duct may be substantially tubular in shape, or it may be conical, or any other shape suitable for achieving the required bleed flow through the duct. Where there are multiple plenum off-takes and/or multiple second bleed plenums such that multiple ducts are required, the ducts may be of just one type or of different types. For example, at least one duct may be defined by sidewalls configured as bellows, and additionally at least one duct may include a piston seal which is slideably engageable with its plenum off-take.

The, or each, duct may have an inner sleeve, and this may be particularly advantageous where a duct is defined by sidewalls configured as bellows. The inner sleeve can reduce turbulence of air flow inside the duct, and may also help to reduce resonant effects caused by air flow through the duct. The inner sleeve may extend from a first end of the duct to terminate in a free end at the second end of the duct. The free end may then form a stop which contacts an abutment formation (e.g. a pipe fitting of the second outer casing if the free end is the radially outer end of the sleeve, or a pipe fitting of the respective off-take if the free end is the radially inner end of the sleeve) when the bellows contracts on relative movement between the first and second outer casings to shorten the duct. This contact of the stop and the abutment formation can put a limit on contraction of the bellows, and thereby help to prevent disengagement of the duct from a fitting at the other end of the sleeve with, as the case may be, the plenum off-take or second outer casing.

The, or each, duct can be connected at a first end to its respective plenum off-take, and connected at a second end to a respective port in the second outer casing for the transport of the bleed flow away from that plenum. However, there may be a spacer member disposed between the second end of the duct and the port in the second outer casing, such that the, or each, duct is connected to its respective port via the spacer member, and projects radially outwardly of the second outer casing. The spacer member may be, for example, an annular member which surrounds the second end of the duct. This may be beneficial particularly in the case where, without use of such a spacer, the duct is of a length which would otherwise result in the duct protruding substantially into its second bleed plenum. More generally, duct length is preferably selected to be appropriate to the distance between the duct's plenum off-take and port. However, sometimes longer duct lengths may be desirable, e.g. in order satisfy component life prediction requirements, in which case the spacer can allow a longer duct to be used without it protruding into the second bleed plenum.

The plenum off-take of at least one second plenum may be a curved off-take such that a radially outer wall of the second plenum curves smoothly into the respective duct, Providing such a curved off-take may allow for better quality of air flow (i.e. less turbulence and loss) through the off-take into the duct.

The flow cross-sectional area of each duct at its plenum off-take may be ⅓ or less of the area on a half longitudinal cross-section through the compressor of the second bleed plenum providing that off-take. This can help to avoid distortion of the bleed flow through the plenum by increasing the time that air is retained in the plenum before onward transfer through the duct.

The bleed flows may, in use, be separately directed for a variety of purposes. These purposes may include, but are not limited to, transfer of the bleed flows for internal cooling of parts of the engine, providing handling and starting bleeds, transfer of the bleed flows for engine and airframe anti-icing, and providing cabin air requirements for an aircraft. For example, portions of one or more bleed flows may, in use, be transferred to cool nozzle guide vanes of the engine. The bleed flow into the first plenum may, in use, be used to supply an aircraft cabin air system.

BRIEF DESCRIPTION OF THE DRAWINGS

Arrangements will now be described by way of example with reference to the accompanying drawings in which.

DETAILED DESCRIPTION OF THE DISCLOSURE

Figure 1:
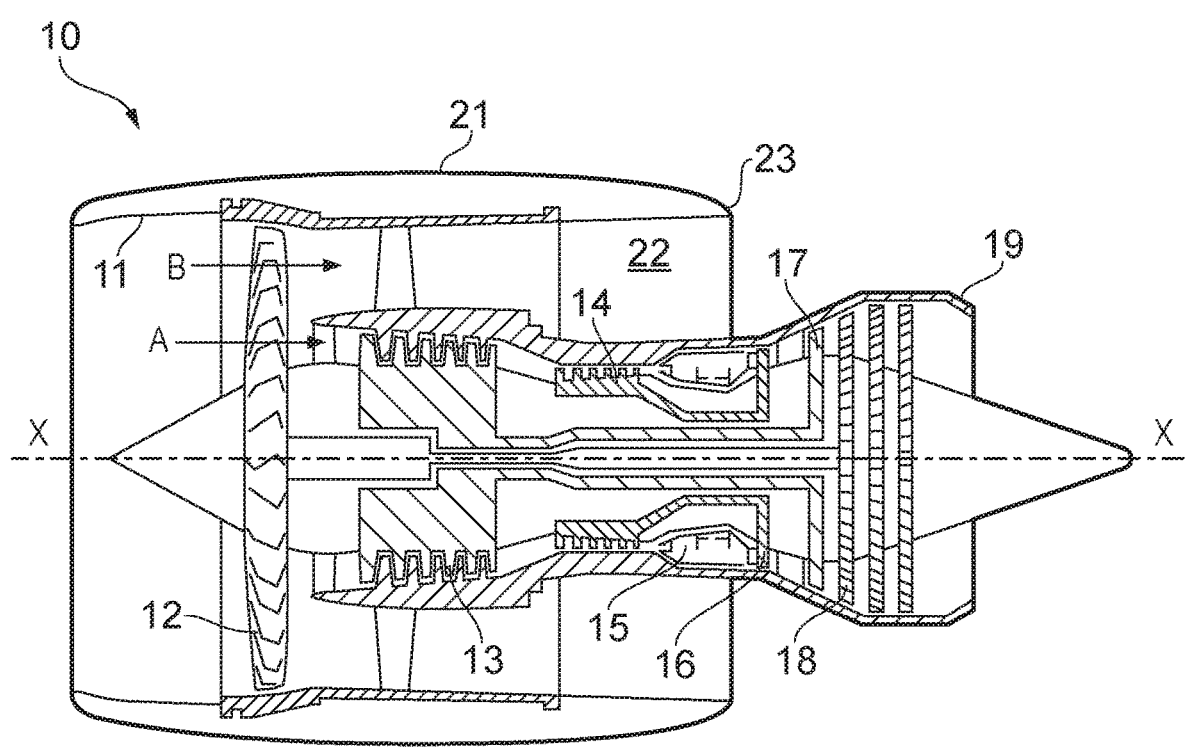
FIG. 1 shows a longitudinal cross-section through a ducted fan gas turbine engine.

With reference to FIG. 1, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 16 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

Figure 2:
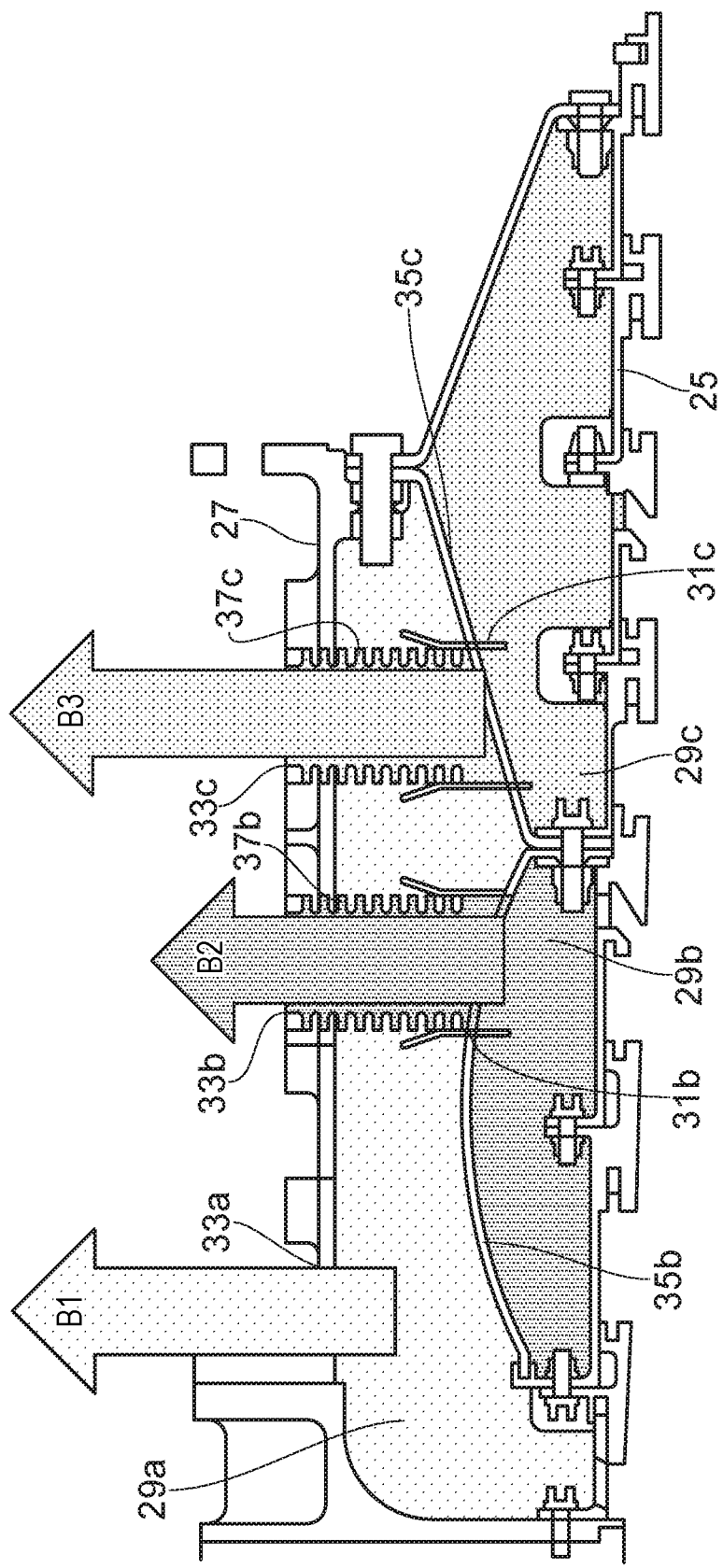
FIG. 2 shows a half longitudinal cross-section through a portion of a multi-stage compressor between first and second outer casings of the compressor.
Figure 3:
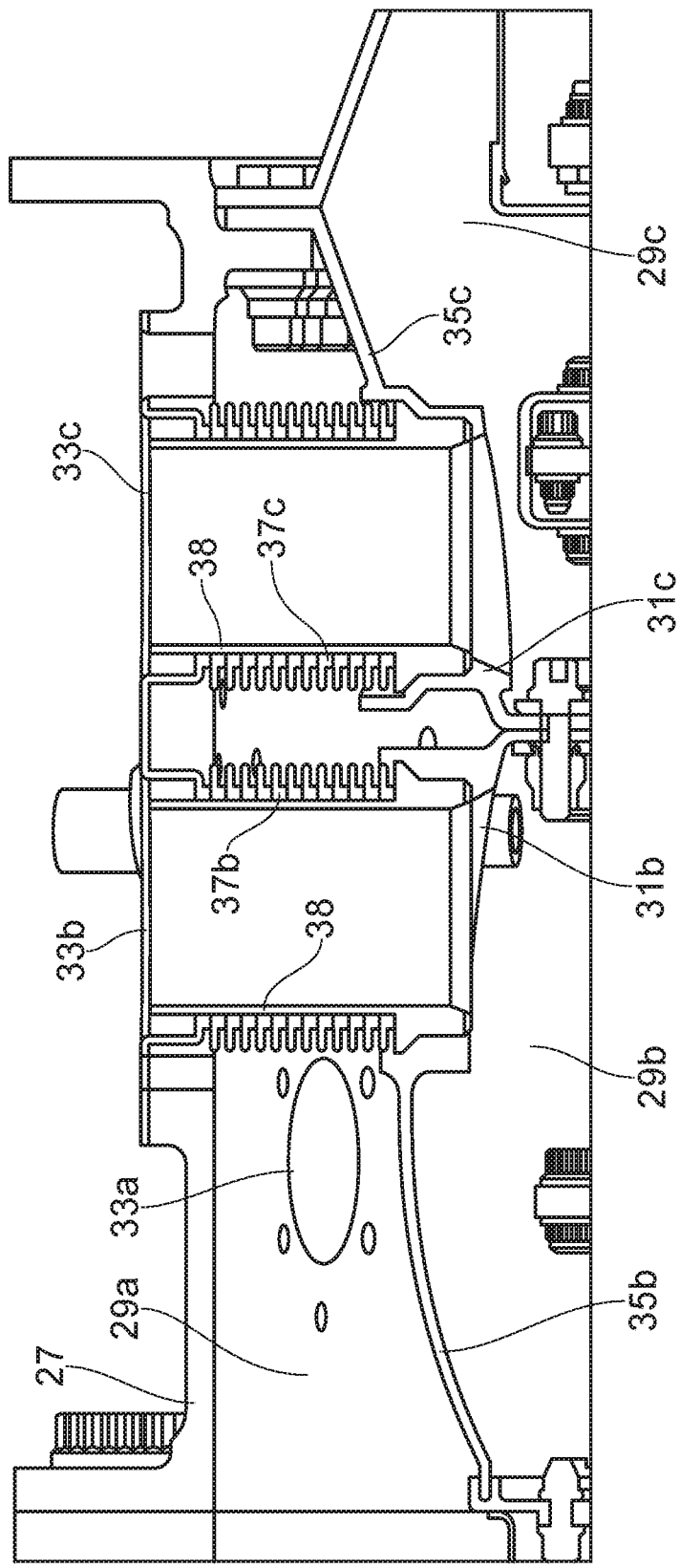
FIG. 3 shows a half longitudinal cross-section through a portion of a variant of the multi-stage compressor of FIG. 2.

FIG. 2 shows a half longitudinal cross-section through a portion of the multi-stage high pressure compressor 14, and FIG. 3 shows a half longitudinal cross-section through a portion of a variant of the multi-stage compressor. Between first 25 and second 27 outer casings of the compressor 14, three bleed plenums 29a, b, c are located and arranged to receive, in use, bleed flows B1, B2, B3 (indicated FIG. 2) of compressed air from respective stages 3, 5 and 7 of the compressor. Each bleed plenum fluidly communicates with respective ports 33a, b, c in the second outer casing of the compressor for transport of the bleed flow away from that plenum. A first one of the bleed plenums 29a overlaps the two other (second) bleed plenums 29b, c such that a part of the first bleed plenum is disposed radially outwardly of radially outer walls 35b, c of the second bleed plenums. The radially outer walls of the second plenums are curved and cone-shaped respectively.

The two second bleed plenums 29b, c fluidly communicate with their ports 33b, c via respective offtakes 31b, c formed in their radially outer walls, and respective ducts 37b, c which extend entirely radially through the first bleed plenum from the off-takes to affix to the ports. Each of the ducts has sidewalls which are configured as bellows, such that in use, the bellows may flex to accommodate relative movement between the first 25 and second 27 outer casings. Additionally, as shown in FIG. 3, each duct may have an inner sleeve 38, which can reduce flow turbulence through the duct, and additionally may help to prevent resonant effects caused by air flow through the ducts.

The flow cross-sectional area of each duct 37b, c at its plenum off-take may be ⅓ or less of the area on a half longitudinal cross-section through the compressor of the second bleed plenum providing that off-take. This can help to avoid distortion of the bleed flow through the plenum by increasing the time that air is retained in the plenum before being onwardly transferred.

Figure 4:
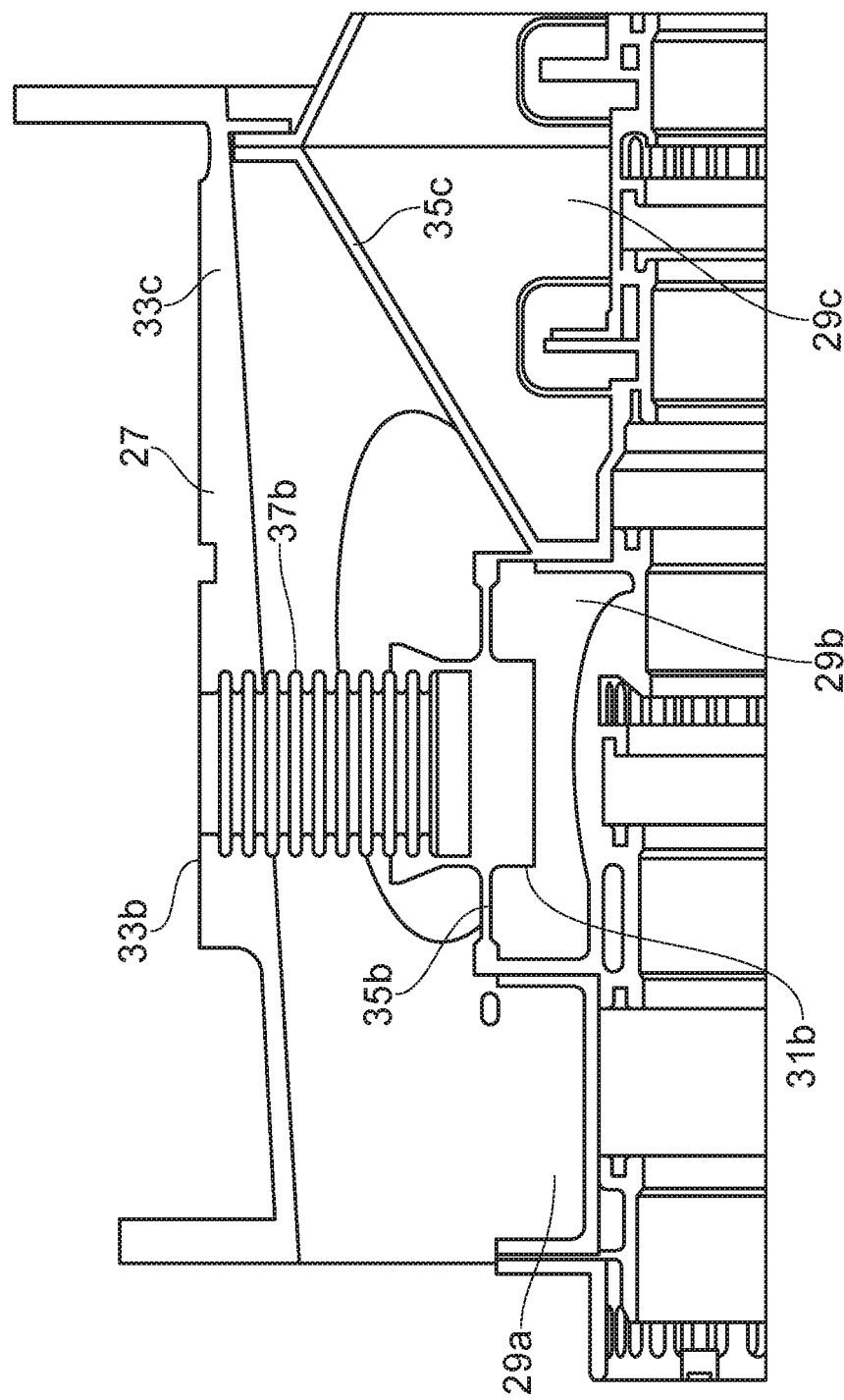
FIG. 4 shows a half longitudinal cross-section through a portion of another variant of the multi-stage compressor of FIG. 2.

FIG. 4 shows a second half longitudinal cross-section through a portion of another variant of the multi-stage high pressure compressor. In the variant, the radially outer wall 35b of the second plenum 29b is straight rather than curved on the cross-section. Also the off-take and the duct from the second bleed plenum 29c to the port 33c is not shown.

Figure 5:
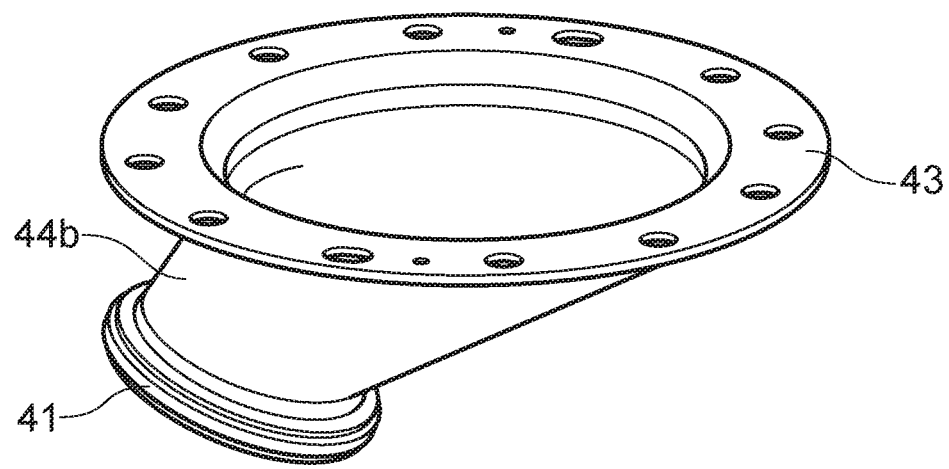
FIG. 5 shows a perspective view of a duct.

FIG. 5 shows a perspective view of a second type of duct 44b from those shown in FIGS. 2, 3 and 4, and FIG. 6 shows a half longitudinal cross-section through a portion of a multi-stage compressor between first 25 and second 27 outer casings of the compressor, and including a duct 44b. The duct has a flow cross section which increases with increasing radial distance along the length of the duct, and accordingly the duct may be described as being conical in shape. The duct includes a piston seal 41, which is slideably engageable with the plenum off-take 31b to allow relative movement between the duct and the off-take, thereby accommodating for relative movement between the first 25 and second 27 outer casings. The duct is formed with a flange 43 by which the duct can be affixed to the second outer casing.

Figure 6:
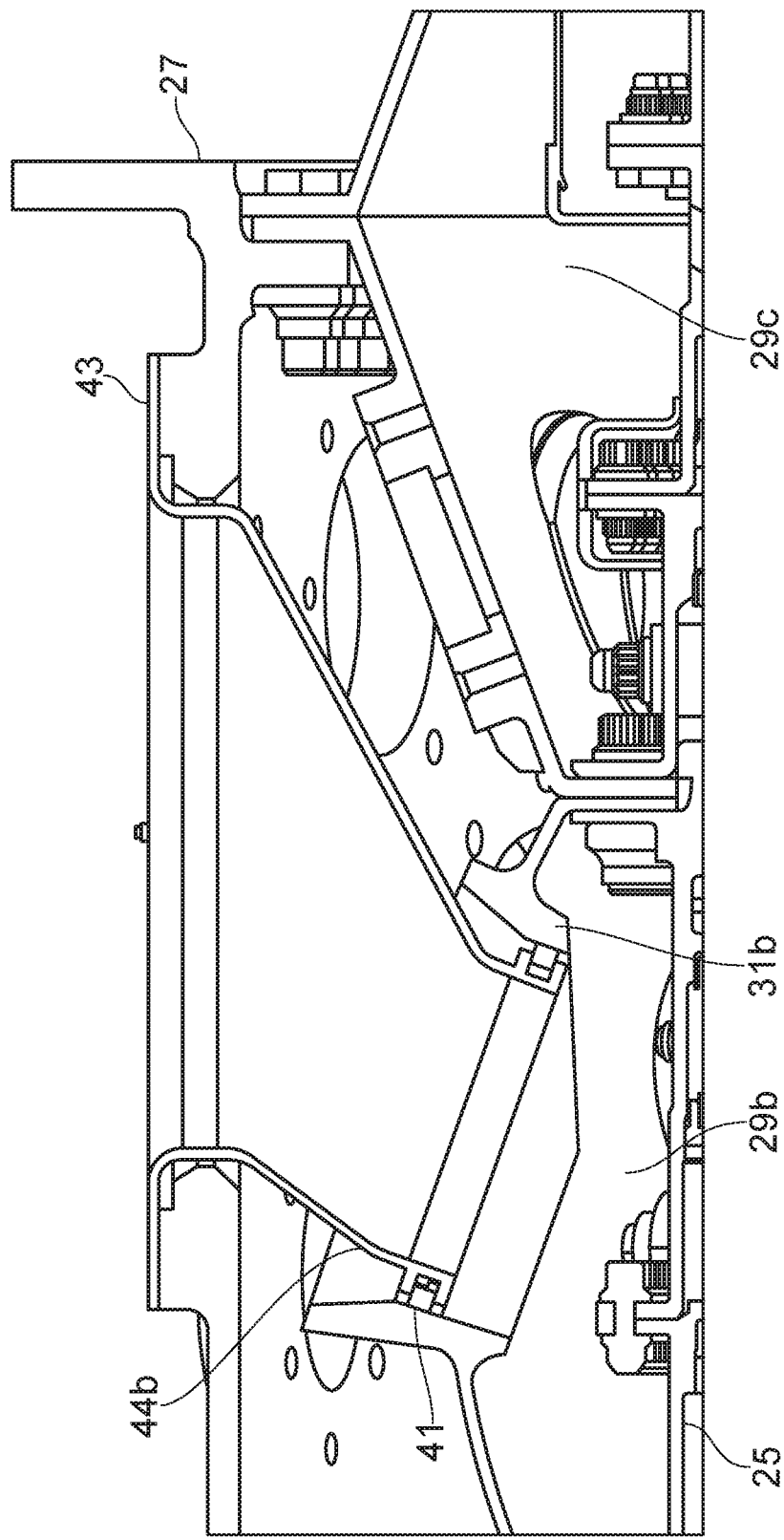
FIG. 6 shows a half longitudinal cross-section through a portion of a multi-stage compressor between first and second outer casings of the compressor, and including the duct of FIG. 5.
Figure 7:
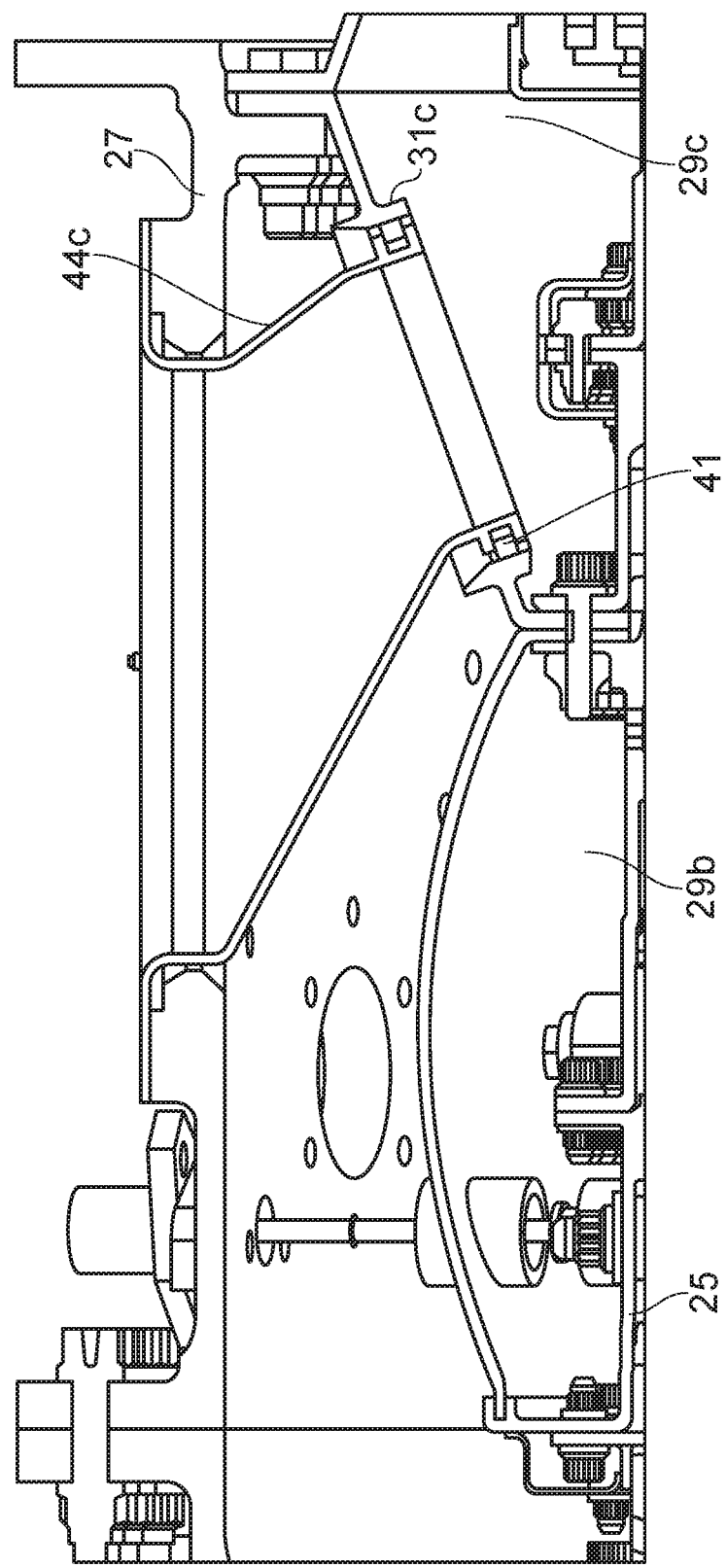
FIG. 7 shows another half longitudinal cross-section through a portion of the multi-stage compressor of FIG. 6.

FIG. 7 shows another half longitudinal cross-section through a portion of the multi-stage compressor of FIG. 6. In this view, a conical 44c duct from plenum 29c is shown. Similarly to FIG. 6, the piston seal 41 of the duct 44c is slideably engageable with the plenum off-take 31c.

Figure 8:
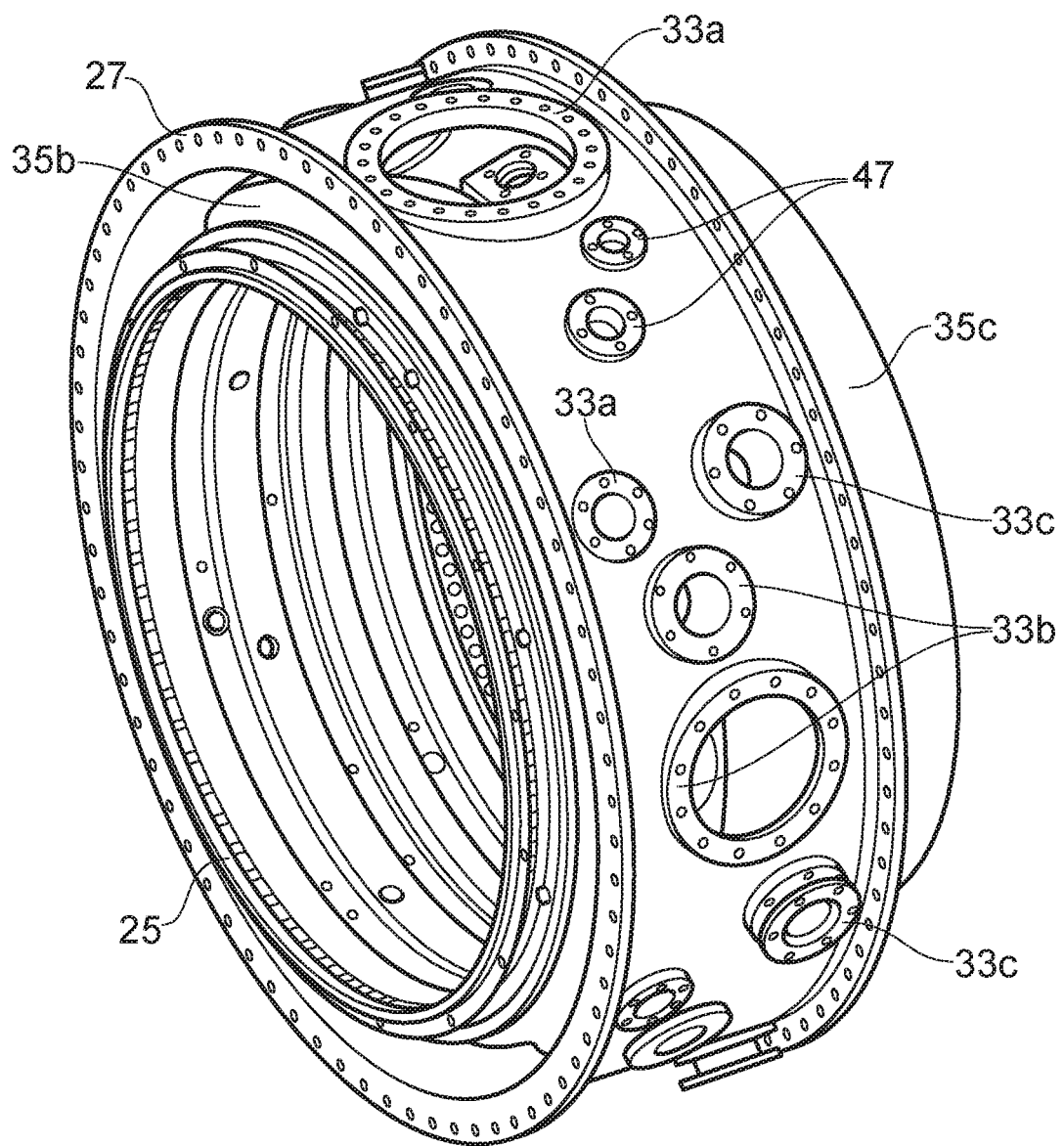
FIG. 8 shows a perspective view of a portion of the first and second outer casings of the multi-stage compressor of FIG. 3, showing a typical location of ports in the second outer casing.

FIG. 8 shows a perspective view of a portion of the first 25 and second 27 outer casings of the multi-stage compressor of FIG. 3, showing a typical location of the multiple ports 33a, b, c in the second outer casing 27. Instrumentation bosses 47 are also visible, Ports 33a are in fluid communication with plenum 29a. Ports 33b are in fluid communication with plenum 29b. Ports 33c are in fluid communication with plenum 29c, Portions of the radially outer walls 35b, c of the second plenums are also shown. Different ports are sized according to their respective flow requirements. For example, ports for directing a bleed flow to a cabin air system, and ports for directing a bleed flow to provide handling and starting bleeds are typically larger than, those ports which transfer a bleed flow to cool nozzle guide vanes.

Figure 9:
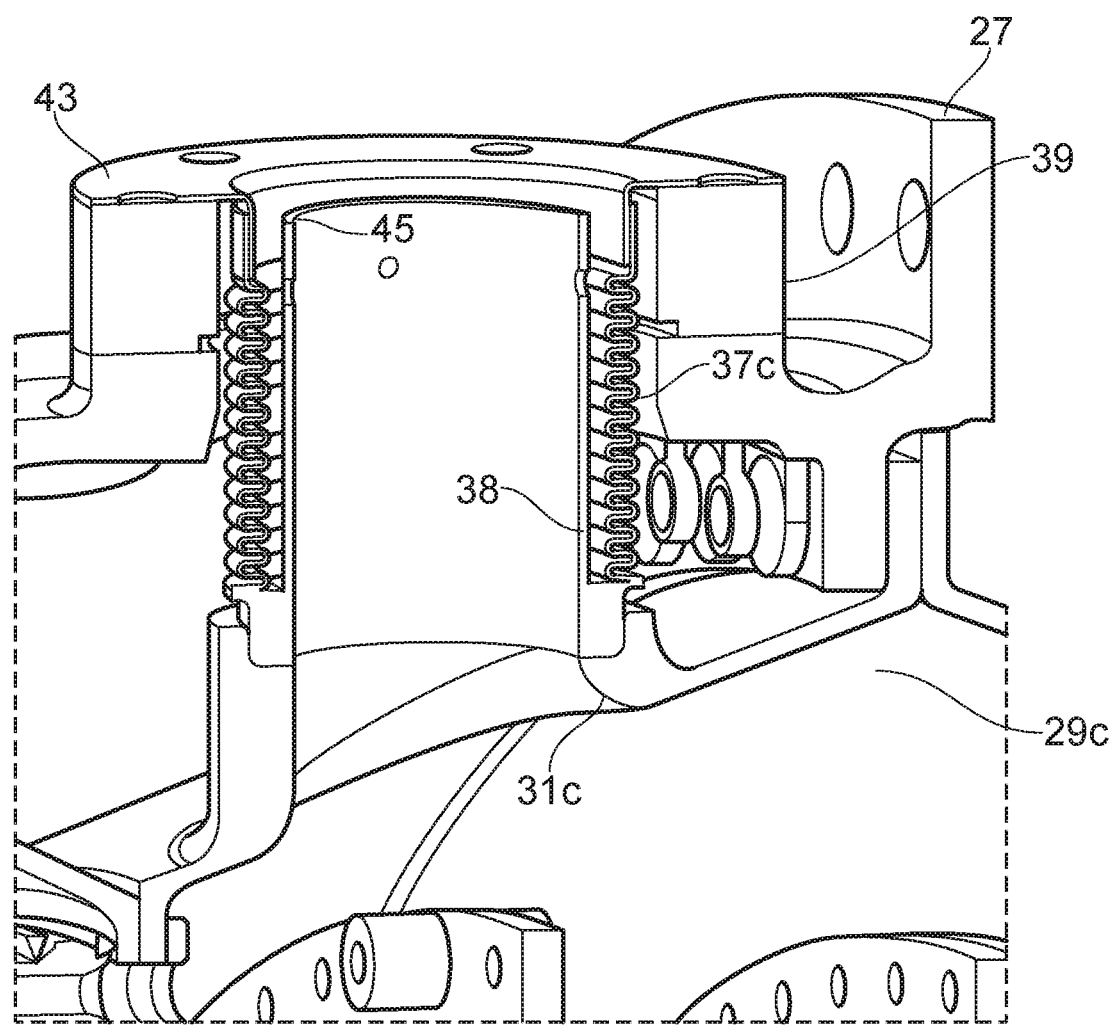
FIG. 9 shows a perspective sectioned view of a curved plenum off-take of the multi-stage compressor of FIG. 3, a duct connecting the off-take to the second outer casing via a spacer member.

FIG. 9 shows a perspective sectioned view of a curved plenum off-take 31c of the second plenum 29c of the multi-stage compressor of FIG. 3, and of a duct 37c connecting the off-take to the second outer casing 27 via a spacer member 39. The duct is connected to the off-take using an interference fit. The spacer member extends the length of the duct bellows, due to the placement of the spacer member between the outside of the second outer casing and a flange 43 at the radially outer end of the duct. Extending the length of the bellows in this way can help it to meet predicted lifetime requirements. If the spacer member were not present and the bellows were the same length, the inner end of the duct could be made to protrude into the plenum, but this would tend to reduce the quality of the air flow into the duct by increasing turbulence and losses at the entrance to the duct. The curved plenum off-take can also improve the air flow quality into the duct.

In the configuration of FIG. 9, the duct 37c has an inner sleeve 38 located internally of the bellow sidewalls. As previously mentioned, presence of such an inner sleeve can improve air flow quality within the duct by reducing turbulence, and may also help to prevent resonant effects due to air flow within the duct. The inner sleeve extends from an end of the duct at the interference fit with the off-take 31c to terminate at a free end 45 adjacent the second outer casing 27. The free end thus forms a stop which contacts a mating pipe fitting (not shown) attached to the flange 43 of the duct when the bellow sidewalls contract on relative movement between the first and second outer casings to shorten the duct. This contact of the stop and the pipe fitting limits the contraction of the bellow sidewalls. In turn, this can help to prevent disengagement of the interference fit between the duct and the plenum off-take.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting, Various changes to the described embodiments may be made without departing from the spirit and scope of the invention.

I claim:

1. A multi-stage compressor of a gas turbine engine, the compressor having:
   a first outer casing;
   a second outer casing radially outward of the first outer casing; and
   a first bleed plenum and one or more second bleed plenums located between the first and second outer casings and arranged to receive, in use, bleed flows of compressed air from respective stages of the compressor and to send the bleed flows to respective ports in the second outer casing, wherein
   the first bleed plenum overlaps the, or each, second bleed plenum such that the, or each, second bleed plenum fluidly communicates with its respective port via a respective duct which, on extending between an off-take from the corresponding second bleed plenum to the respective port, passes through the first bleed plenum;
   the, or each, duct is configured to accommodate relative movement between the first outer casing and the second outer casing by being flexible so as to be able to bend; and
   the, or each, duct includes an inner sleeve (i) within an outer surface of the duct and (ii) configured to extend from one end of the duct to another end of the duct.

2. The multi-stage compressor of claim 1, wherein the, or each, second bleed plenum is at least partially defined by a respective radially outer wall, and at least a part of the first bleed plenum is disposed radially outwardly of the, or each, outer wall.

3. The multi-stage compressor of claim 1, wherein the first bleed plenum is arranged to receive a bleed flow of compressed air from a stage of the compressor which is upstream of the stage(s) of the compressor from which the second bleed plenum(s) are arranged to receive bleed flow(s) of compressed air.

4. The multi-stage compressor of claim 1, wherein the multi-stage compressor is a highest pressure compressor of a gas turbine engine.

5. The multi-stage compressor of claim 1, wherein one or more of the ducts is defined by sidewalls configured as bellows which, in use, flex to accommodate the relative movement between the first outer casing and the second outer casing.

6. The multi-stage compressor of claim 1, wherein a flow cross-sectional area of each of the ducts at its second bleed plenum off-take is ⅓ or less of an area on a half longitudinal cross-section through the compressor of the corresponding second bleed plenum.

7. The multi-stage compressor of claim 1, wherein at least one of the ducts is connected to its respective port in the second outer casing via a spacer member such that the at least one duct projects radially outwardly of the second outer casing.

8. The multi-stage compressor according to claim 1, wherein at least one second plenum off-take is a curved off-take such that a radially outer wall of the second plenum curves smoothly into the respective duct.

9. A gas turbine engine having the multi-stage compressor of claim 1.

10. The gas turbine engine of claim 9, wherein at least one of the bleed flows is, in use, directed to cool nozzle guide vanes of the engine.

11. The gas turbine engine of claim 9, wherein the bleed flow from the first plenum is, in use, directed to supply an aircraft cabin air system.

* * * * *